(12) United States Patent
Chen et al.

(10) Patent No.: US 11,347,914 B1
(45) Date of Patent: May 31, 2022

(54) SYSTEM AND METHOD FOR AUTOMATIC PERFORMANCE ANALYSIS IN AN ELECTRONIC CIRCUIT DESIGN

(71) Applicant: Cadence Design Systems, Inc., San Jose, CA (US)

(72) Inventors: Wei-Cheng Chen, Taiwan (CN); Yuan-Kai Pei, Taiwan (CN); Yu-Chi Su, Taiwan (CN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/337,984

(22) Filed: Jun. 3, 2021

(51) Int. Cl.
*G06F 30/31* (2020.01)
*G06F 30/36* (2020.01)
*G06F 119/06* (2020.01)
*G06F 111/02* (2020.01)

(52) U.S. Cl.
CPC ............. *G06F 30/31* (2020.01); *G06F 30/36* (2020.01); *G06F 2111/02* (2020.01); *G06F 2119/06* (2020.01)

(58) Field of Classification Search
CPC ...... G06F 30/31; G06F 30/36; G06F 2111/02; G06F 2119/06
See application file for complete search history.

(56) References Cited

U.S. PATENT DOCUMENTS

| | | | | |
|---|---|---|---|---|
| 8,949,671 | B2 * | 2/2015 | Mukherjee | G06F 11/0766 714/38.1 |
| 10,198,540 | B1 * | 2/2019 | Cohen | G06F 30/3312 |
| 11,216,606 | B1 * | 1/2022 | Turbovich | G06F 30/3308 |
| 2007/0038896 | A1 * | 2/2007 | Champlin | G06F 11/366 714/38.1 |
| 2011/0283247 | A1 * | 11/2011 | Ho | G06F 11/362 716/107 |
| 2014/0316761 | A1 * | 10/2014 | Thach | G06F 9/455 703/22 |
| 2020/0327040 | A1 * | 10/2020 | Booth | G06F 11/3664 |

\* cited by examiner

*Primary Examiner* — Nha T Nguyen
(74) *Attorney, Agent, or Firm* — Mark H. Whittenberger, Esq.; Holland & Knight LLP

(57) ABSTRACT

The present disclosure relates to a method for use with an electronic design. Embodiments may include performing, using a processor, an electronic design process on a portion of an electronic design. Embodiments may also include automatically monitoring the electronic design process on a periodic basis using a pulse monitor to acquire one or more sampling results and storing the one or more sampling results. Embodiments may further include providing, during the electronic design process, the one or more sampling results to a graphical user interface.

14 Claims, 12 Drawing Sheets

17 consecutive callstacks for pcell evaluation

```
...
ilxSkillEval2
cdsSkillPcell::pcellEval
cdsSkillPcell::onEval
OpenAccess_4::oaDesignData::createSubMaster
OpenAccess_4::oaRefHeaderTbl::bind
OpenAccess_4::oaViaHeaderTbl::bind
OpenAccess_4::oaViaHeaderTbl::bindViaHeaderMaster
OpenAccess_4::oaViaHeaderTbl::bindAll
OpenAccess_4::oaDesignData::open
OpenAccess_4::oaDesign::open
dbOpenCellViewByType
...
```

2 callstacks

```
...
techtdbUtil::setImplicitRefForTechs
techFileCallback::onFirstOpen
OpenAccess_4::oaTechData::completeOpen
OpenAccess_4::oaTechData::open
OpenAccess_4::oaDesignData::bindTech
OpenAccess_4::oaDesignData::postOpen
OpenAccess_4::oaDesignData::open
OpenAccess_4::oaDesign::open
dbOpenCellViewByType
...
```

1 callstack

```
...
OpenAccess_4::oaTechHeaderTbl::bindAll
OpenAccess_4::oaTechData::postOpen
OpenAccess_4::oaTechData::open
OpenAccess_4::oaTechData::open
OpenAccess_4::oaDesignData::bindTech
OpenAccess_4::oaDesignData::postOpen
OpenAccess_4::oaDesignData::open
OpenAccess_4::oaDesign::open
dbOpenCellViewByType
...
```

SYSTEM AND METHOD FOR AUTOMATIC PERFORMANCE ANALYSIS IN AN ELECTRONIC CIRCUIT DESIGN

FIELD OF THE INVENTION

The embodiments of the present disclosure relate to a method of electronic circuit design, and more particularly, to a method for automated debugging in an electronic circuit design.

BACKGROUND

Electronic design automation (EDA) tools exist currently and allow circuit designers to monitor electrical issues while creating a layout. These tools may allow a user to electrically analyze, simulate, and verify interconnect decisions in real time. These tools may be used to shorten the electronic circuit design cycle by up to 30 percent, optimize chip performance, and utilize less area. Diagnostic capabilities may be included within these tools to assist with debugging processes.

SUMMARY

Accordingly, an embodiment of the present disclosure is directed to a computer-implemented method for use with an electronic design. The method may include performing, using a processor, an electronic design process on a portion of an electronic design. The method may also include automatically monitoring the electronic design process on a periodic basis using a pulse monitor to acquire one or more sampling results and storing the one or more sampling results. The method may further include providing, during the electronic design process, the one or more sampling results to a graphical user interface.

One or more of the following features may be included. In some embodiments, the method may include determining if the one or more sampling results are idle using a filtering process. The one or more sampling results may be associated with a callstack. The method may further include analyzing a callstack history. The method may also include comparing the one or more sampling results and the callstack history. The method may also include detecting at least one suboptimal pulse and updating a status at the graphical user interface, based upon, at least in part, the suboptimal pulse. The at least one pulse may be selected from the group consisting of: a vibrant pulse, an absent pulse, and a weak pulse. The graphical user interface may include a status bar configured to display at least one of counter information, function information, known pattern information, or extracted callstack information.

In another embodiment of the present disclosure a computer-readable storage medium having stored thereon instructions, which when executed by a processor result in a number of operations is provided. Operations may include performing, using a processor, an electronic design process on a portion of an electronic design. Operations may also include monitoring the electronic design process on a periodic basis using a pulse monitor to acquire one or more sampling results and storing the one or more sampling results. Operations may further include providing, during the electronic design process, the one or more sampling results to a graphical user interface.

One or more of the following features may be included. In some embodiments, operations may include determining if the one or more sampling results are idle using a filtering process. The one or more sampling results may be associated with a callstack. Operations may further include analyzing a callstack history. Operations may also include comparing the one or more sampling results and the callstack history. Operations may also include detecting at least one suboptimal pulse and updating a status at the graphical user interface, based upon, at least in part, the suboptimal pulse. The at least one pulse may be selected from the group consisting of: a vibrant pulse, an absent pulse, and a weak pulse. The graphical user interface may include a status bar configured to display at least one of counter information, function information, known pattern information, or extracted callstack information.

In yet another embodiment of the present disclosure a computing system for use in an electronic circuit design is provided. The system may include at least one processor configured to perform an electronic design process on a portion of an electronic design and automatically monitor the electronic design process on a periodic basis using a pulse monitor to acquire one or more sampling results. The at least one processor may be further configured to cause a storing the one or more sampling results and to provide, during the electronic design process, the one or more sampling results to a graphical user interface.

One or more of the following features may be included. In some embodiments, the at least one processor may be further configured to determine if the one or more sampling results are idle using a filtering process.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 5 is shows callstack examples consistent with an automatic monitoring process according to an embodiment of the present disclosure;

DETAILED DESCRIPTION

Figure 1:
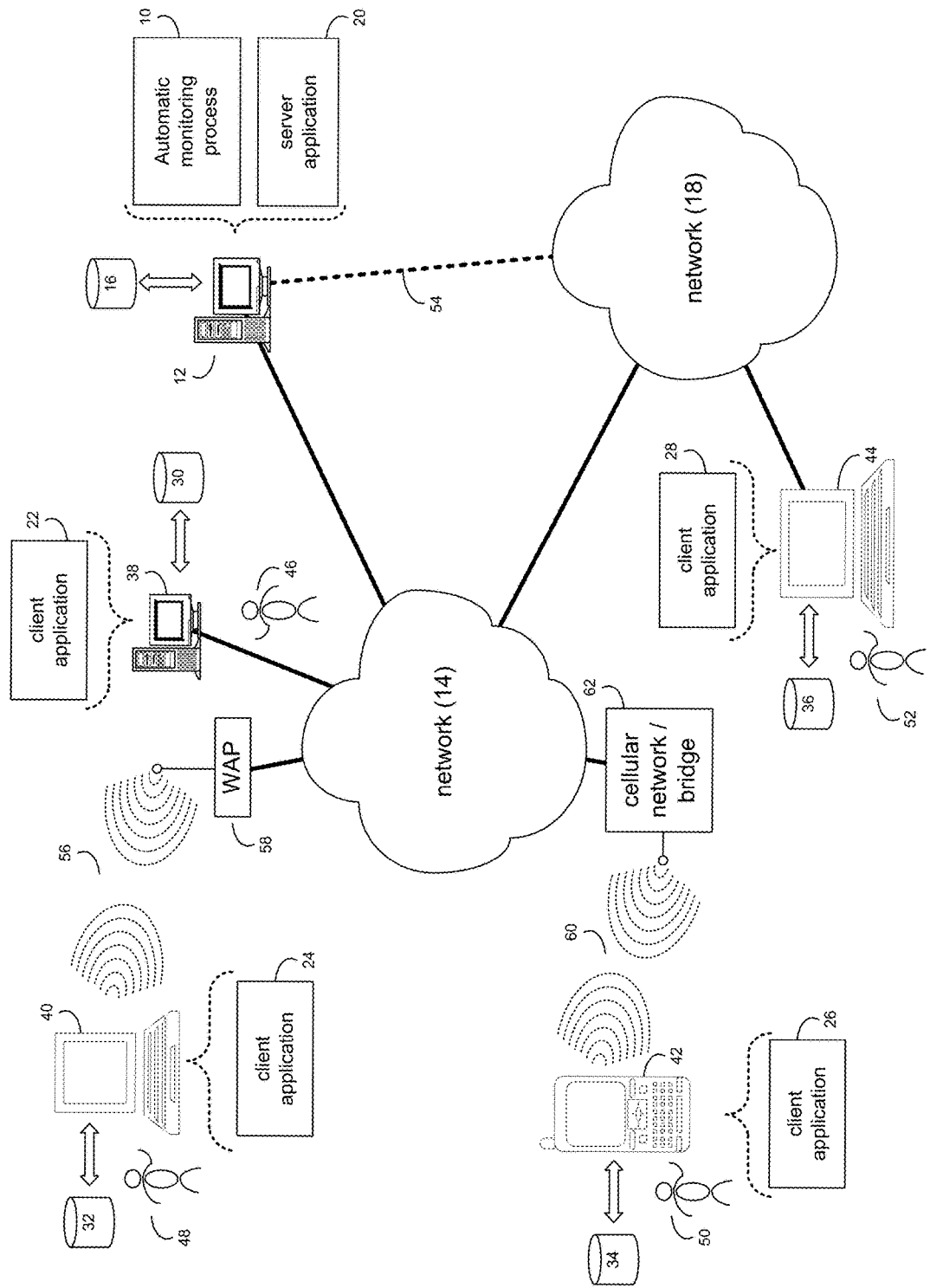
FIG. 1 diagrammatically depicts an automatic monitoring process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity Like reference numerals in the drawings denote like elements.

Referring to FIG. 1, there is shown automatic monitoring process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the automatic monitoring process may reside on a client electronic device, such as a personal computer, notebook computer, personal digital The instruction sets and subroutines of automatic monitoring process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute automatic monitoring process 10. Examples of client applications 22, 24, 26, 28 may include, but are not limited to, design verification tools such as those available from the assignee of the present disclosure. These applications may also be executed by server computer 12. In some embodiments, automatic monitoring process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the automatic monitoring process may be a client-side application (not shown) residing on one or more client electronic devices 38, 40, 42, 44 (e.g., stored on storage devices 30, 32, 34, 36, respectively). As such, the automatic monitoring process may be a stand-alone application that interfaces with a client application (e.g., client applications 22, 24, 26, 28), or may be an applet/application that is executed within a client application. As such, the automatic monitoring process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, automatic monitoring process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
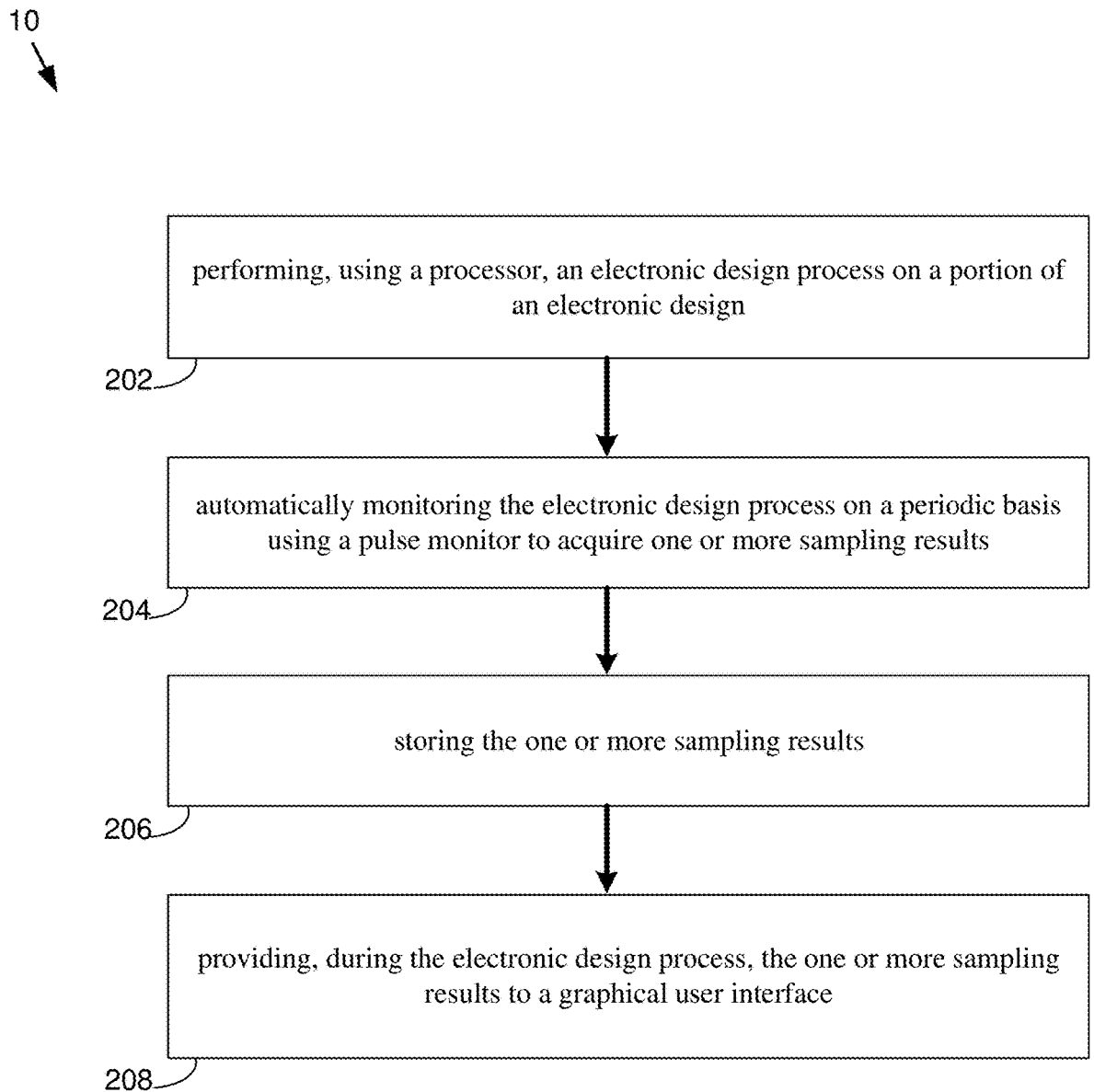
FIG. 2 is an exemplary flowchart of an automatic monitoring process according to an embodiment of the present disclosure.

Referring now to FIG. 2, a flowchart depicting an embodiment consistent with automatic monitoring process 10 is provided. The method may include performing (202), using a processor, an electronic design process on a portion of an electronic design. The method may also include automatically monitoring (204) the electronic design process on a periodic basis using a pulse monitor to acquire one or more sampling results and storing (206) the one or more sampling results. The method may further include providing (208), during the electronic design process, the one or more sampling results to a graphical user interface. Numerous additional operations are also within the scope of the present disclosure.

In some embodiments, automatic monitoring process 10 may be associated with one or more EDA applications and may include performance diagnostic tools that include various sampling mechanisms, which may collect data about various callstacks that may store information about the active subroutines associated with an EDA program. Aspects of automatic monitoring process 10 may be configured to monitor the performance of one or more electronic design processes that may be associated with a portion of an electronic design. Some electronic design processes may include, but are not limited to, simulation, floor plan, place and routing, layout editing, RC extraction, design rule checking, etc.

Embodiments included herein may allow the user to collect correct debugging data and perform automatic callstack analysis without the delays associated with existing approaches.

In some embodiments, automatic monitoring process 10 may utilize a pulse monitor to perform real-time detection of the issue causing a reduction in performance. In some embodiments, the pulse monitor may be configured to analyze a health status of an EDA process by continuously sampling (e.g., callstack per second) and analyzing a pulse pattern consisting of consecutive callstacks during a period of time.

In some embodiments, the pulse monitor of automatic monitoring process 10 may operate using a variety of different pulse types. Some of these may include, but are not limited, to a vibrant or idle pulse, an absent pulse and/or a weak pulse. Accordingly, automatic monitoring process 10 may be configured to continuously take the pulse of the callstack at a predefined time (e.g., every second). The system may monitor the health status of an existing EDA process and may set off an alarm when the pulse is weak or absent.

In some embodiments, pulse types may indicate a health status of the EDA process and present if the EDA process is working normally or encountering performance issues. An absent pulse may present if the process is stuck in a specific leaf function and no response has been received for a period of time. A weak pulse may present if the process is stuck in non-leaf functions for a period of time and the cost of these functions far exceeds expectation. A vibrant pulse may present if the EDA process is running on jobs and the cost of each function meets expectations. An idle pulse may present if the EDA process is free and available for user input. The absent and weak pulse are suboptimal pulse types and indicate that the EDA process is encountering performance issues. If automatic monitoring process 10 detects the EDA process is stuck in a leaf function longer than a threshold in a slow pattern file, the process may report an absent pulse. If the leaf function is not defined in a slow pattern file, automatic monitoring process 10 may apply a global threshold. For a weak pulse, if automatic monitoring process 10 detects that the EDA process is stuck in a non-leaf function, this may indicate that consecutive callstacks match a slow pattern and longer than a threshold in the slow pattern file. Automatic monitoring process 10 may then report a weak pulse. Unlike an absent pulse, a weak pulse may be defined explicitly in a slow pattern file. The vibrant and idle pulse are normal pulse types and indicate the EDA process is running in health status. Each of these pulse types is discussed in further detail hereinbelow.

In some embodiments, a normal pulse may indicate either an idle or that the pulse is vibrant (e.g., not stuck somewhere). An absent pulse may indicate that consecutive callstacks are identical (e.g., stuck at a leaf function) and/or typically waiting for something. Automatic monitoring process 10 may proactively tell the user that the currently operating EDA process is not the bottleneck of the performance issue. In contrast, a weak pulse may indicate that a series of callstacks are almost identical (e.g., stuck at a non-leaf function in a predefined set, slow pattern). For example, if a user applies an incorrect setup and triggers unneeded features or checks per editing command, automatic monitoring process 10 may expose it so that the user may adjust the setup to obtain better performance. Moreover, automatic monitoring process 10 may define the sensitivity level to reduce the false alarm. This may be achieved using any suitable approach including machine learning methodologies.

In some embodiments, a vibrant pulse may indicate that the EDA process is running in a health status or is available for a user input operation. The absent pulse may indicate that the EDA process is stuck at a leaf function for a period of time. From the callstack information, automatic monitoring process 10 may determine that the bottleneck may be located inside the EDA process or associated with another external dependency (e.g., waiting for information from a third party tool). The weak pulse may indicate that the EDA process is spending extra effort in a specific task but is still running (not stuck). After further analysis of a callstack pattern, automatic monitoring process 10 may obtain information, including, but not limited to, high-level feature name, bottleneck function, etc. Referring to case 1 of FIG. 7, the high-level feature is that the user may attempt to open a circuit design and then encounters a bottleneck during pcell evaluation, which exceeds a threshold defined in a slow pattern. Automatic monitoring process 10 may then report a weak pulse with a suggestion.

In some embodiments, automatic monitoring process 10 may be configured to alarm the user with readable information and the user may confirm if the primary EDA process is performing as expected or not. Simultaneously, automatic monitoring process 10 may append critical debugging information regarding performance in a command log to help with the debugging process. Moreover, if the pulse pattern matched a pre-defined set, the pulse monitor could adjust a sensitivity level of such pattern or report more real-time information, such as the cause of problem and known solutions.

In some embodiments, automatic monitoring process 10 may be configured to provide notification at a higher level that may be understood by the end user while retaining detailed callstack information for subsequent analysis.

In some embodiments, automatic monitoring process 10 may be configured to automatically generate a self-contained monitor logfile, which may be mixed with a running logfile of the EDA process and additional information surrounding the detecting of weak and/or absent pulses. The information inside a monitor logfile may report pulse type, fainting symptom, duration and/or suggestions to improve performance. The logfile may further include a file link to an additional event file, which may include additional details such as callstack history within duration of this pulse event. The monitor logfile may be configured to associate user operation and performance issues together, which may help to infer which steps are leading to performance issues.

Figure 3:
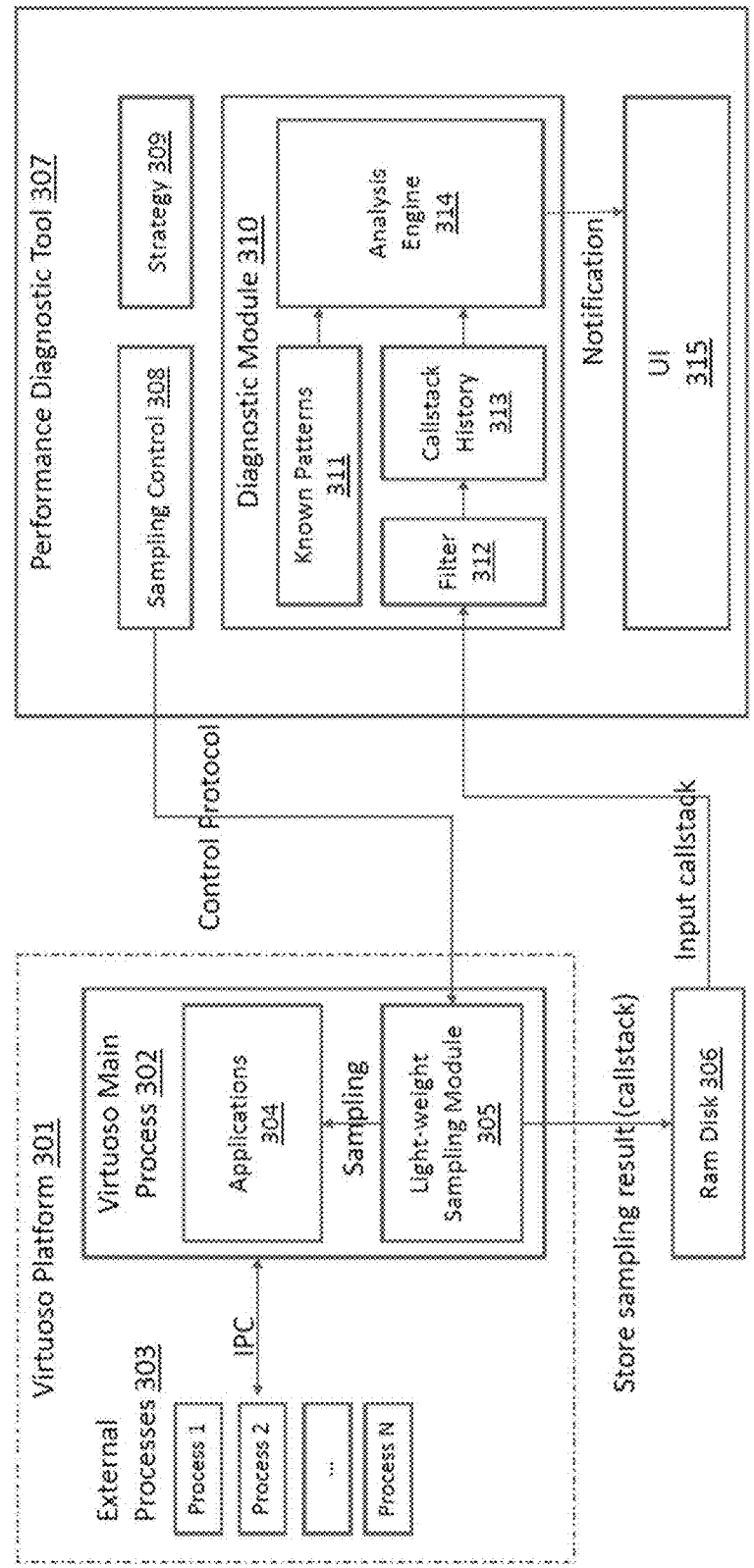
FIG. 3 is an illustration of a schematic of an automatic monitoring process according to an embodiment of the present disclosure.

Referring now to FIG. 3, a system diagram 300 associated with automatic monitoring process 10 is provided. An EDA platform 301 may include EDA process 302 and external processes 303 (e.g., 3rd party tools for design rule checking, circuit design management system, etc.). The performance diagnostic tool 307 may be launched to monitor the corresponding EDA process 302. Embodiments of the present disclosure may be configured so that performance diagnostic tool 307 may be setup with pulse monitor strategy 309 including a user preferred setting in order to operate as a pulse monitor to sample a callstack of EDA applications 304. This may be achieved using sampling control 308 and light-weight sampling module 305. The sampling result (e.g., callstack) may be stored in a predefined directory inside storage 306 and then input to diagnostic module 310 for real-time analysis of the callstack transition. In some embodiments, the first operation of diagnostic module 310 may be to check if the callstack is idle using filter 312. Then, the new input callstack may be analyzed with a previous callstack history 313 using analysis engine 314, which may be configured to detect a suboptimal pulse and then update the alarm status of graphical user interface 315.

Figure 4:
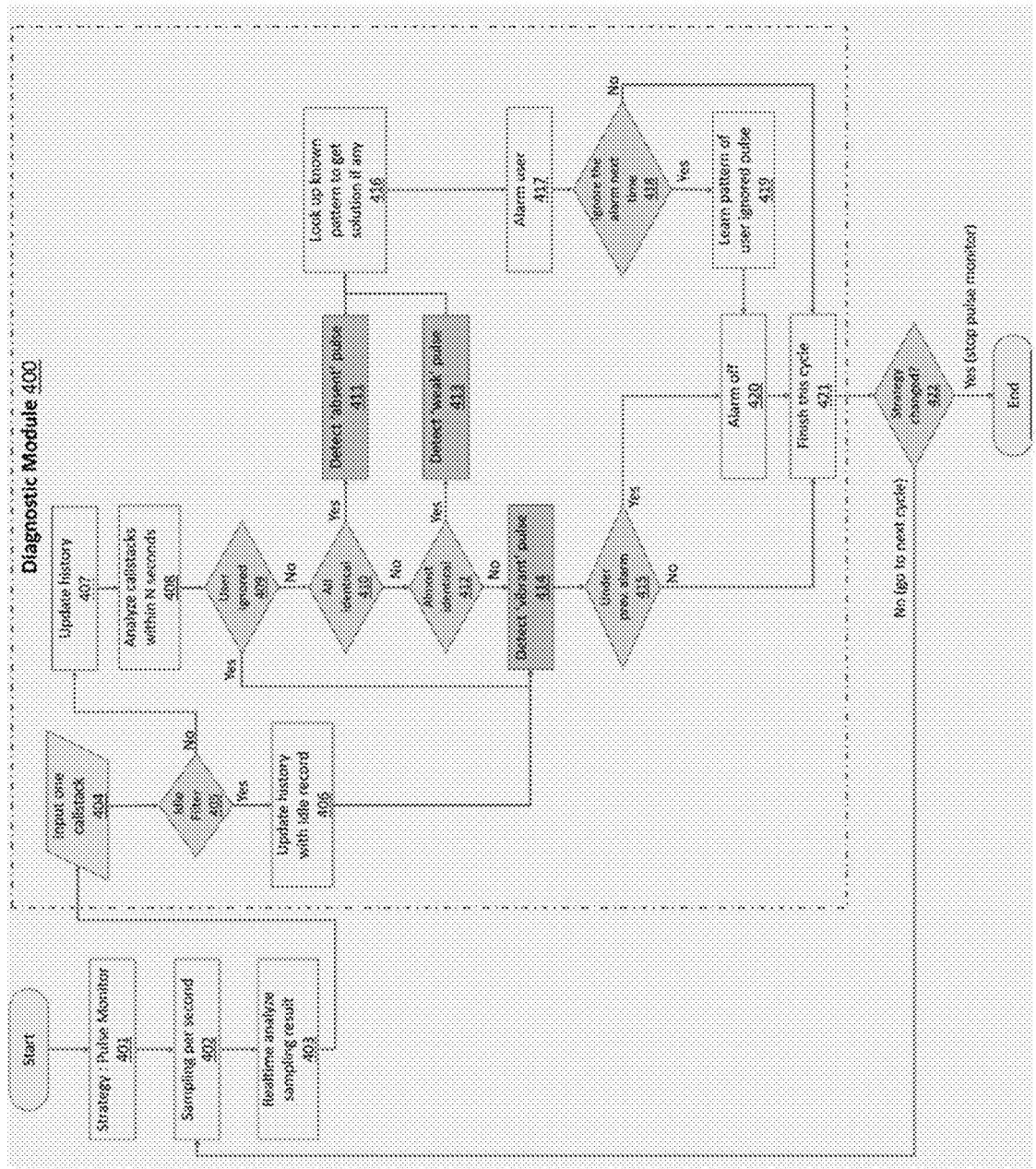
FIG. 4 is an illustration of a schematic of an automatic monitoring process according to an embodiment of the present disclosure.

Referring now to FIG. 4, a flowchart 400 corresponding to an embodiment of a diagnostic module associated with automatic monitoring process 10 is provided. In this example, the process may allow for the pulse monitor setup 401 then it will start to sample callstack per second 402 and real-time analyze sampling result 403 by input callstack 404 to diagnostic module 400.

In some embodiments, there are four major decisions (405, 409, 410, 412) that may recognize the pulse pattern. The first decision, idle filter 405, may filter out all idle callstack patterns in the pre-defined set. The idle callstack is a critical point that EDA process may quit previous busy status and be available for user input. Therefore, the time-point may be tagged in callstack history 406 and treated as a vibrant pulse 414. If the previous status is under alarm 415, the process may turn off alarm 420 and finish this cycle 421. If the previous status is alarm off, no update may be provided to the user and the process may finish this cycle 421 silently.

In some embodiments, and referring back to idle filter 405, if the callstack is not idle, the analysis engine may update history 407 first and then analyze the pulse pattern of all callstacks within the latest N seconds 408. The second decision may check if the pulse pattern is a user ignored pattern 409 or not. Initially, there is no user ignored pattern inside the database. If the ignored pattern is detected, it may indicate that the engine has reported 417 an alarm to the user but the user may disagree and believe that the application works as expected and thus may want to ignore 418 this type of pulse pattern going forward. As such, the engine would learn 419 the user preferred pulse pattern and treat it as vibrant pulse then proceed related flow 414. If the pulse pattern is not user ignored 409, the third decision would be executed to check whether all callstacks are identical or not 410. If all of the callstacks are identical, it may indicate that the EDA process may be stuck at the same leaf function and there may be no response for a period of time. Therefore, the engine would identify 411 it as an absent pulse.

In some embodiments, if the system determines 410 that pulse pattern is not all identical, the final decision would be executed to check 412 whether the callstacks are almost identical or not. If the callstacks are almost identical or have a high similarity, it may indicate that the EDA process is dedicated on a specific task but still running (not stuck in leaf function). Accordingly, the engine may identify 413 it as a weak pulse. Alternatively, if the callstacks have a low similarity, it may be running in health status so it may be identified 414 as a vibrant pulse.

In some embodiments, the next step of both detections of the absent pulse 411 and the weak pulse 413 is to determine the known pattern and identify any existing solution or extra-debugging tips 416. Then, the process may report 417 an alarm to the user with this information. The engine may then output some debug data for subsequent debugging. As mentioned above, the user may choose to ignore 418 this pulse pattern subsequently and the engine may learn 419 the user preferred pulse pattern. If not ignored, the process may continue and finish 421 this cycle.

Referring now to FIG. 5, an example of detecting a weak pulse (e.g., almost identical) and a known solution is provided. In this example, the process may sample a callstack per second. Here, each sample may analyze the latest 20 callstacks and there are 17 callstacks for pcell evaluation (almost identical (85%)). In other words, the EDA process costs 85% on skill pcell evaluation. Fortunately, this is a known slow pattern with a possible solution. At this point, the engine may inform the user of the bottleneck proactively and suggest that the user turn on the pcell cache to reduce re-evaluation of the next open. The examples shown in FIGS. 4-5 show a detailed flow of one example analysis cycle. If the pulse monitor strategy is unchanged 422, the process may proceed to sample a callstack at the next second 402 and re-start a new analysis cycle repeatedly.

Figure 6:
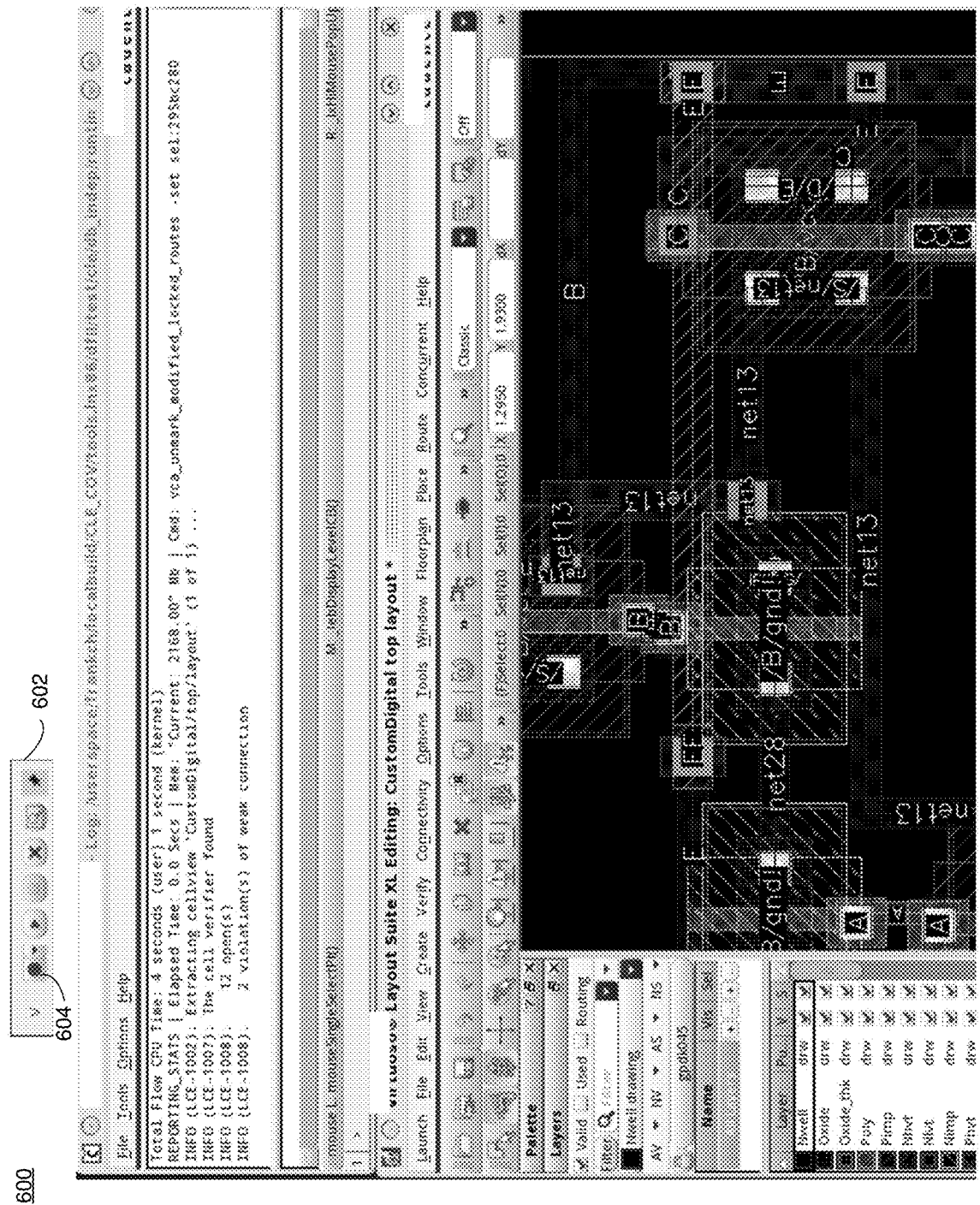
FIG. 6 is a graphical user interface associated with an automatic monitoring process according to an embodiment of the present disclosure.
Figure 7:
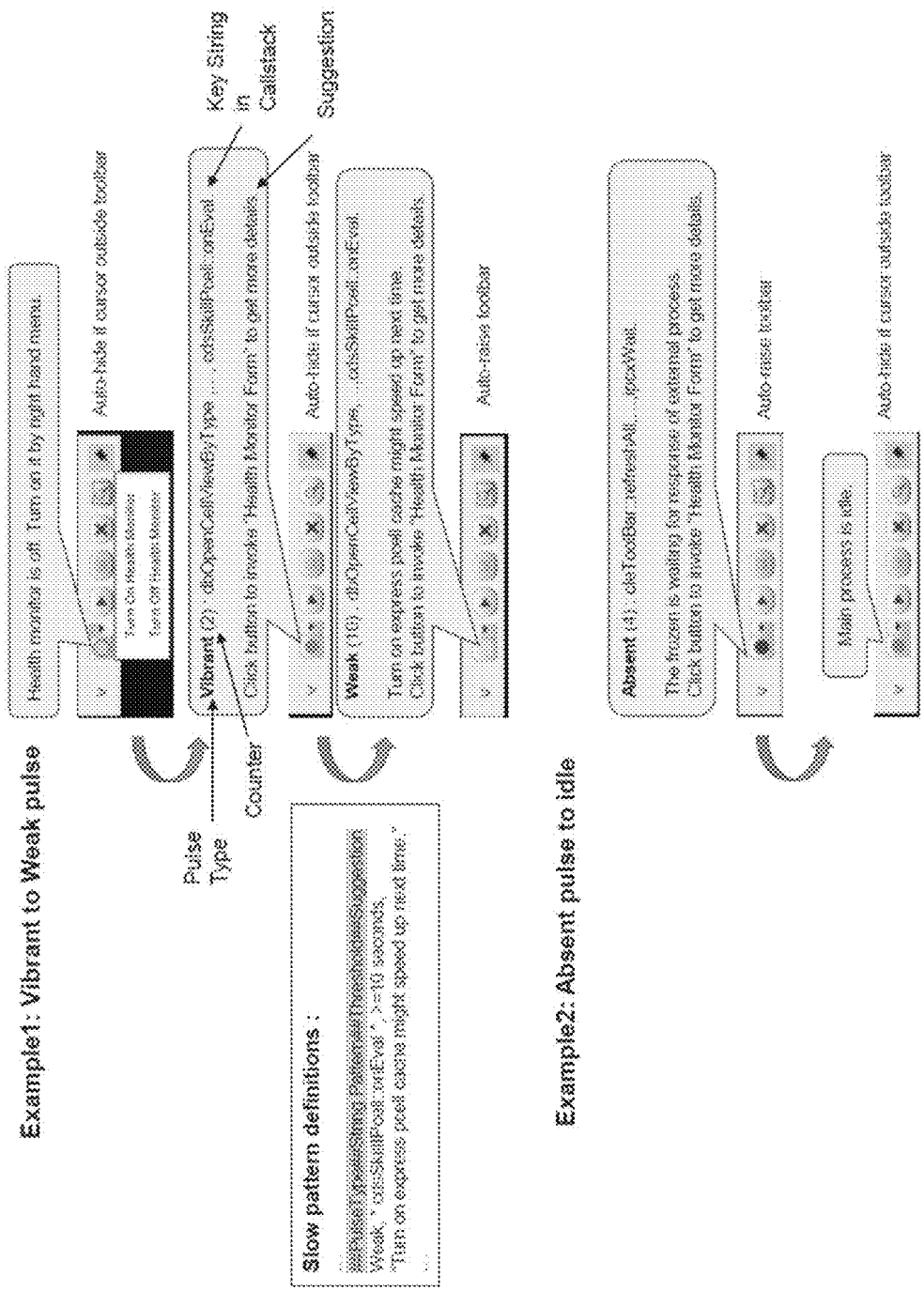
FIG. 7 is a graphical user interface associated with an automatic monitoring process according to an embodiment of the present disclosure.

Referring now to FIGS. 6-7, graphical user interface examples and associated toolbars are provided. FIG. 6 depicts a graphical user interface and an associated toolbar 602, which may be located anywhere within GUI 600. As discussed above, automatic monitoring process 10 may include a health monitor that may be configured to periodically monitor one or more key factors and auto-log if any risk is detected. Automatic monitoring process 10 may provide an indicator to show the health status and expose run-time information to the user. In this way, automatic monitoring process 10 may proactively advise the user if the issue is a known slow pattern. In this particular example, toolbar 602 is displayed for health monitoring. Automatic monitoring process 10 may provide a menu to turn on/off the health monitor and also provide a status icon 604 to display running status. A color coded display may be used to indicate the various types of pulses. For example, a gray status icon indicator may indicate that the health monitor is off and may automatically hide the toolbar. A green status icon indicator may indicate a vibrant pulse (e.g., callstacks are changing but function cost meets expectations) or idle pulse (e.g., callstack is idle) and may automatically hide the toolbar. A yellow status icon indicator may indicate a weak pulse (e.g., callstacks are almost identical in slow pattern and function cost exceed expectation) and may automatically display the toolbar. A red status icon indicator may indicate an absent pulse (e.g., callstacks are all identical, stuck in leaf function) and may automatically display the toolbar.

In some embodiments, automatic monitoring process 10 may utilize various display elements such as tooltips. Some of these may include, but are not limited to, information of the current state (e.g., extract high-level information), counter information (e.g., number of iterations in the current state), advice about the solution or next step, etc. In operation, the user may select an option to invoke a health monitor form to see more details discussed in more detail in FIGS. 10-11. FIG. 7 displays two different cases of a minimized toolbar, one for pcell evaluation and the other for a third party dependent query. Various status icon indicators may be displayed on the minimized toolbar (e.g., gray, green, yellow, red, green respectively in the GUIs of FIG. 7).

In the example of FIG. 7, suppose the sampling rate is per second. And a slow pattern of pcell evaluation is defined with information of pulse type, string pattern to match callstack, time threshold to set off alarm and possible suggestion to improve performance. At runtime, the automatic monitoring process 10 may observe consecutive callstacks containing the same string pattern, which match the above slow pattern for pcell evaluation with 10 seconds threshold. In the first 10 seconds (counter<10), it may indicate a vibrant pulse type and the cost of pcell evaluation meets user expectations. After it lasts more than 10 seconds (counter>=10), automatic monitoring process 10 may then report a weak pulse and because of that the cost of pcell evaluation may far exceed user expectations. Automatic monitoring process 10 may include multiple updated changes, automatically display toolbar, transition a button icon from green to yellow as a visual and/or audio alarm, show pulse event information by tooltips, etc. The tooltips may include, but are not limited to "pulse type", "counter", "key strings in callstack", "suggestion", etc. as shown in FIG. 7. Accordingly, using the key string in callstack, the user may infer that opening this circuit design would trigger pcell evaluation and the effort exceeds user expectations. By taking the suggestion from automatic monitoring process 10, a user might speed up performance and prevent weak pulses during subsequent use.

Figure 8:
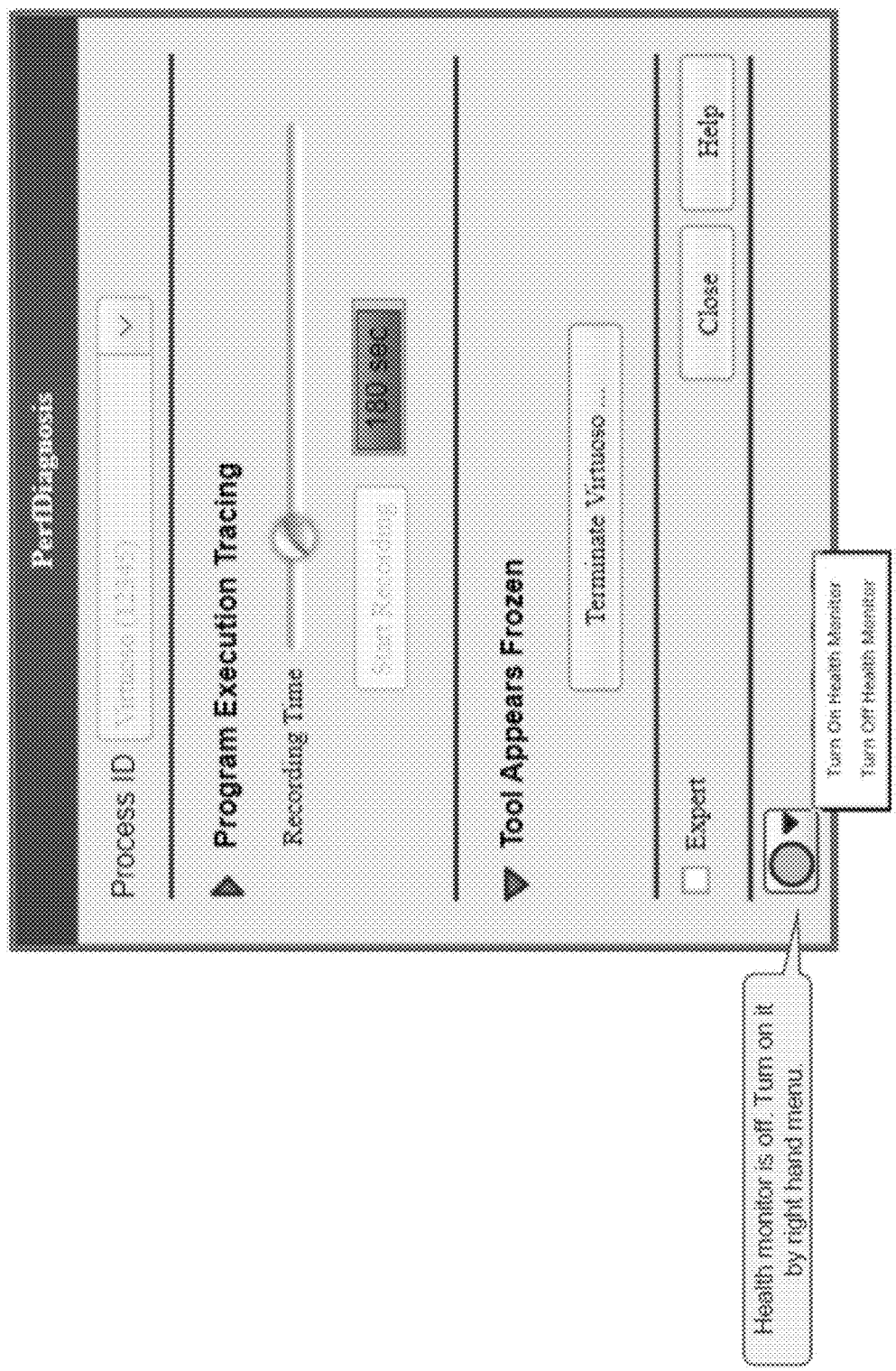
FIG. 8 is a graphical user interface associated with an automatic monitoring process according to an embodiment of the present disclosure.
Figure 9:
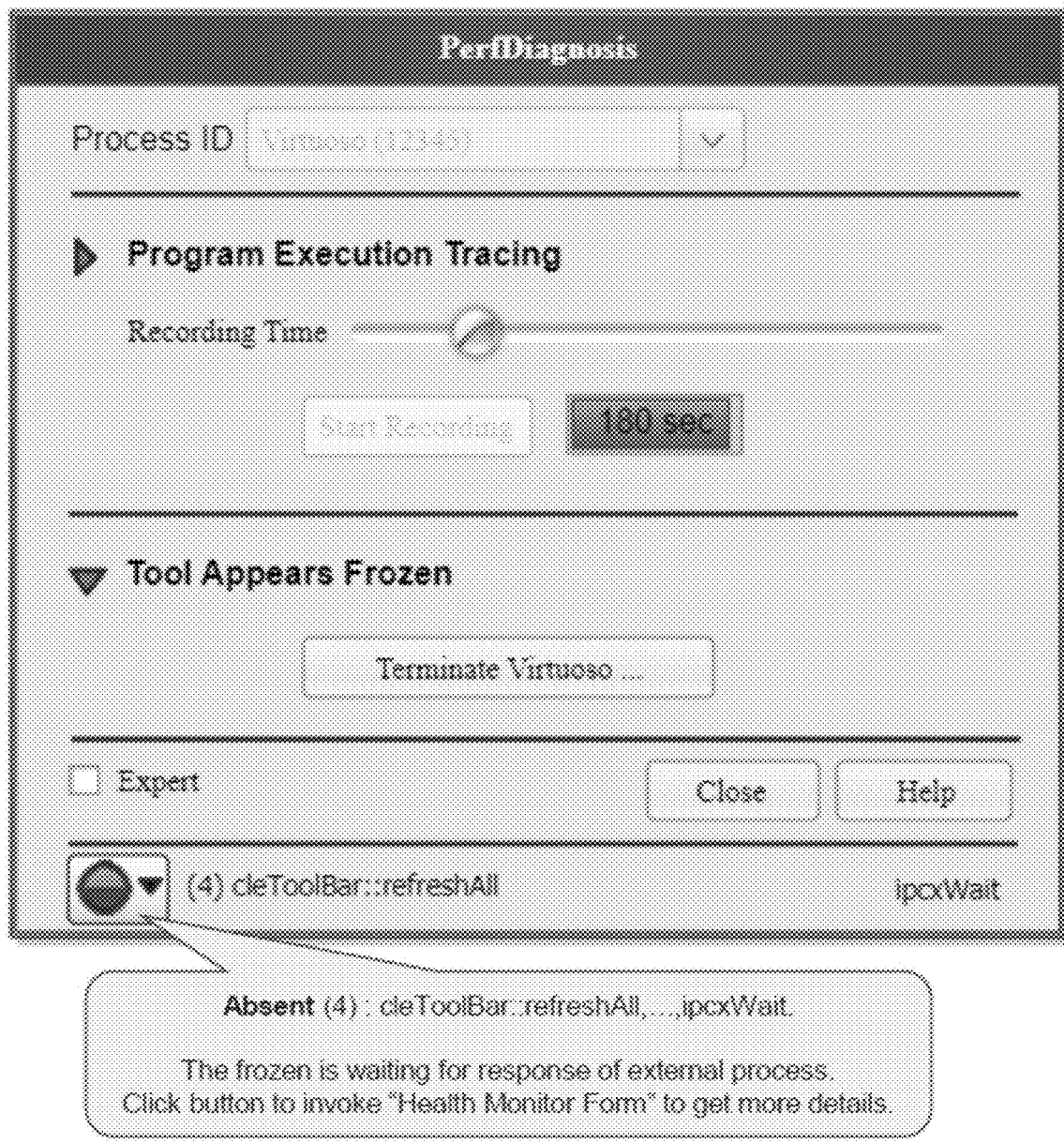
FIG. 9 is a graphical user interface associated with an automatic monitoring process according to an embodiment of the present disclosure.

Referring now to FIGS. 8-9, graphical user interfaces showing examples consistent with automatic monitoring process 10 are provided. Performance diagnostics window 800 includes an example with a gray status icon indicator in FIG. 8 and performance diagnostics window 900 includes an example with a red status icon indicator in FIG. 9. In some embodiments, the performance diagnostics GUI may include a similar button as the minimized toolbar of FIG. 7. The user may select this button to invoke a health monitor form to see more details. As shown in FIG. 9, a GUI including a status bar to present key information in one line may be provided. Some information may include, but is not limited to counter information (e.g., stay in current state for how many iterations), high level functions (e.g., extracted from callstack), other key information if a known slow pattern is identified. The process may also allow for the ability to trim information if necessary.

Figure 10:
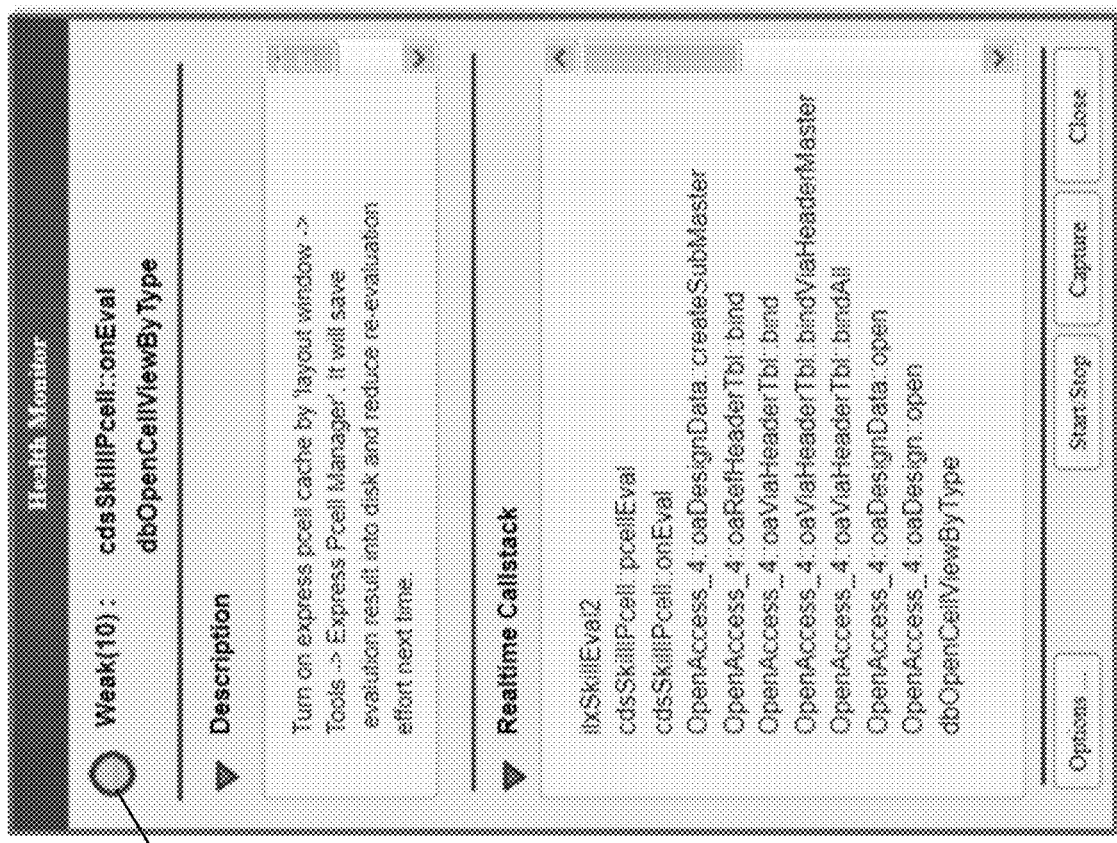
FIG. 10 is a graphical user interface associated with an automatic monitoring process according to an embodiment of the present disclosure.
Figure 11:
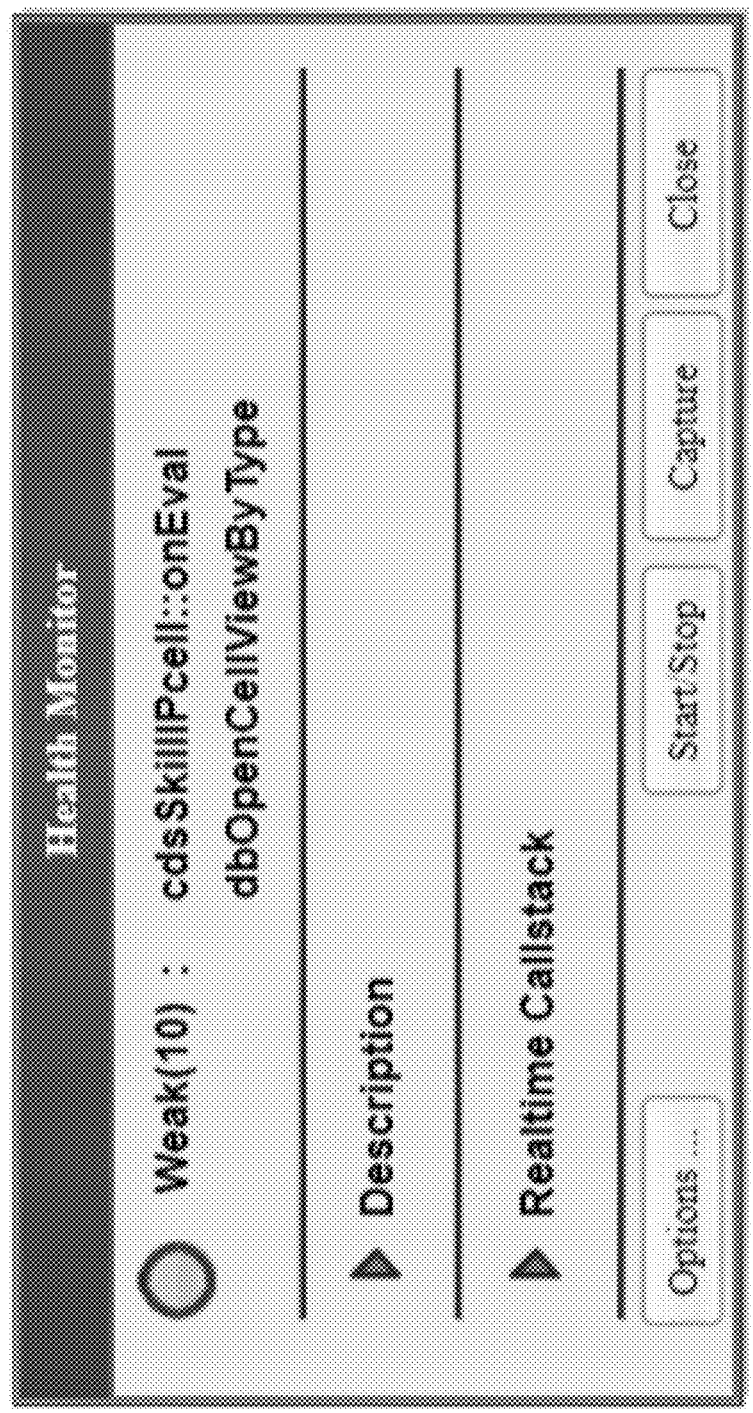
FIG. 11 is a graphical user interface associated with an automatic monitoring process according to an embodiment of the present disclosure.

Referring now to FIGS. 10-11, embodiments of automatic monitoring process 10 showing graphical user interfaces including examples of health monitor forms 1000, 1100 are provided. In some embodiments, the health monitor form may include a status summary that may include an indicator icon 1002, a counter indicating how many loops in the current state, real-time callstack information, etc. The health monitor may provide information regarding the possible cause, a simplified call chain, and may provide advice if any solution to the issue is known. Various options may be provided, some of which may include, but is not limited to, start/stop/toggle button, a capture option, which may export all of the above information and timestamp into new log and then display a log viewer. An option to close or hide the form and continue monitoring is also provided.

Figure 12:
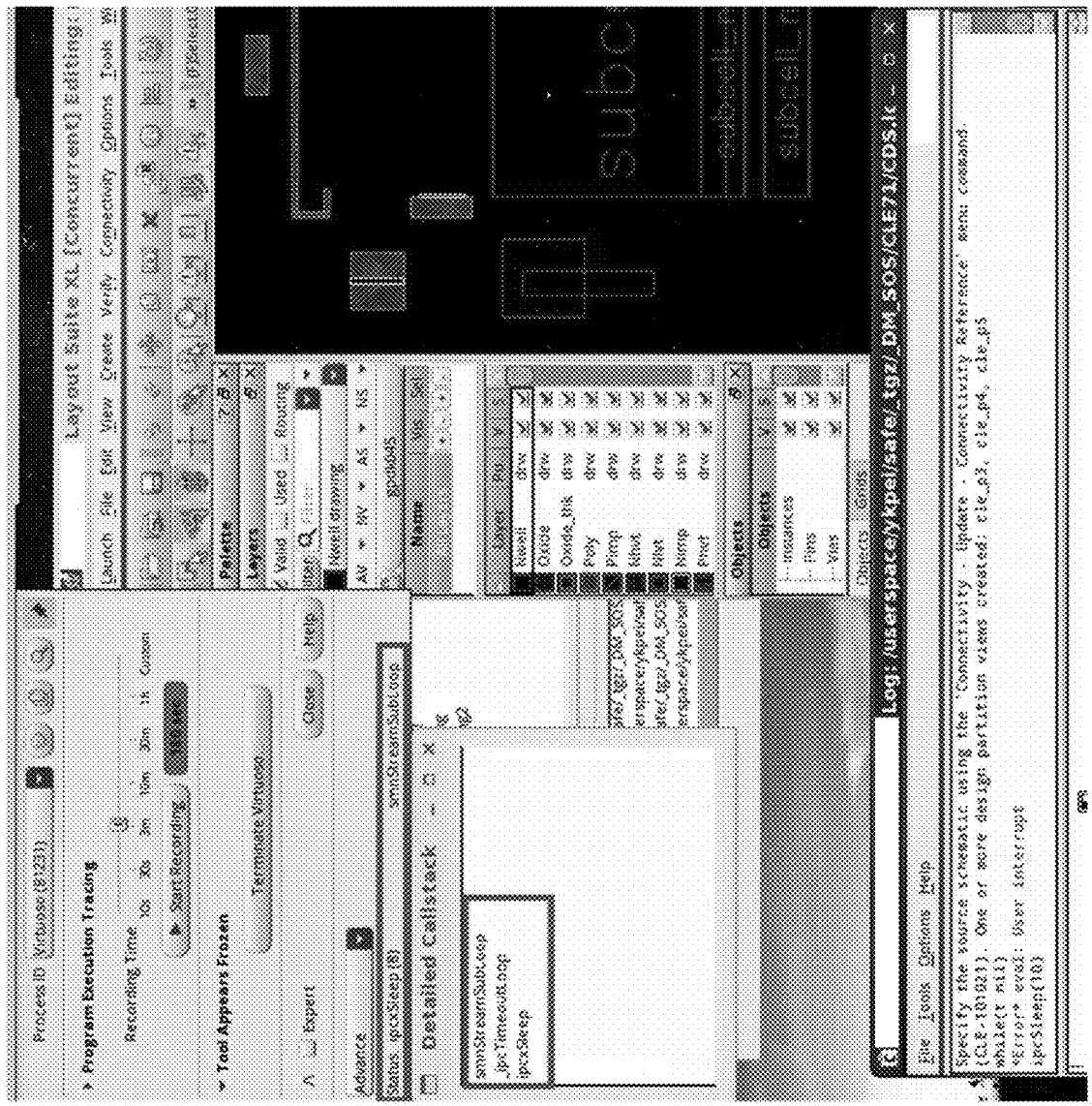
FIG. 12 is a graphical user interface associated with an automatic monitoring process according to an embodiment of the present disclosure

Referring also to FIG. 12, a graphical user interface showing an example display consistent with embodiments of automatic monitoring process 10 is provided. The detailed callstack pane may be configured to shows a non-idle callstack (depth reduced) refreshed every second. In operation, and as discussed above, if the pulse is absent, the status may display two higher-level functions (by heuristic) and a counter (e.g., stuck in this state for how many seconds).

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for use with an electronic design comprising:
   performing, using a processor, an electronic design process on a portion of an electronic design;
   automatically monitoring the electronic design process on a periodic basis using a pulse monitor to acquire one or more sampling results;
   storing the one or more sampling results;
   providing, during the electronic design process, the one or more sampling results to a graphical user interface;
   analyzing a callstack history;
   detecting at least one suboptimal pulse; and
   updating a status at the graphical user interface, based upon, at least in part, the suboptimal pulse.

2. The computer-implemented method of claim 1, further comprising:
   determining if the one or more sampling results are idle using a filtering process.

3. The computer-implemented method of claim 1, wherein the one or more sampling results are associated with a callstack.

4. The computer-implemented method of claim 1, further comprising:
  comparing the one or more sampling results and the callstack history.

5. The computer-implemented method of claim 1, wherein the at least one pulse is selected from the group consisting of: a vibrant pulse, an absent pulse, and a weak pulse.

6. The computer-implemented method of claim 1, wherein the graphical user interface includes a status bar configured to display at least one of counter information, function information, known pattern information, or extracted callstack information.

7. A computer-readable storage medium having stored thereon instructions, which when executed by a processor result in the following operations:
  performing, using a processor, an electronic design process on a portion of an electronic design;
  monitoring the electronic design process on a periodic basis using a pulse monitor to acquire one or more sampling results;
  storing the one or more sampling results;
  providing, during the electronic design process, the one or more sampling results to a graphical user interface;
  analyzing a callstack history;
  detecting at least one suboptimal pulse; and
  updating a status at the graphical user interface, based upon, at least in part, the suboptimal pulse.

8. The computer-readable storage medium of claim 7, further comprising:
  determining if the one or more sampling results are idle using a filtering process.

9. The computer-readable storage medium of claim 7, wherein the one or more sampling results are associated with a callstack.

10. The computer-readable storage medium of claim 7, further comprising:
  comparing the one or more sampling results and the callstack history.

11. The computer-readable storage medium of claim 7, wherein the at least one pulse is selected from the group consisting of: a vibrant pulse, an absent pulse, and a weak pulse.

12. The computer-readable storage medium of claim 7, wherein the graphical user interface includes a status bar configured to display at least one of counter information, function information, known pattern information, or extracted callstack information.

13. A computing system for use in an electronic circuit design comprising:
  at least one processor configured to perform an electronic design process on a portion of an electronic design and automatically monitor the electronic design process on a periodic basis using a pulse monitor to acquire one or more sampling results, the at least one processor further configured to cause a storing the one or more sampling results and to provide, during the electronic design process, the one or more sampling results to a graphical user interface, the at least one processor further configured to analyze a callstack history and to detect at least one suboptimal pulse, wherein the at least one processor is further configured to update a status at the graphical user interface, based upon, at least in part, the suboptimal pulse.

14. The computing system of claim 13, wherein the at least one processor is further configured to determine if the one or more sampling results are idle using a filtering process.

* * * * *